United States Patent [19]

Yamazaki et al.

[11] Patent Number: 5,027,424
[45] Date of Patent: Jun. 25, 1991

[54] IMAGE READER

[75] Inventors: Yoshihiro Yamazaki; Manabu Imoto, both of Tokyo, Japan

[73] Assignee: Asahi Kogaku Kogyo K.K., Tokyo, Japan

[21] Appl. No.: 351,301

[22] Filed: May 12, 1989

Related U.S. Application Data

[63] Continuation of Ser. No. 91,136, Aug. 31, 1987, abandoned.

[30] Foreign Application Priority Data

Aug. 29, 1986 [JP] Japan .................................. 61-203470
Aug. 29, 1986 [JP] Japan .................................. 61-230471

[51] Int. Cl.$^5$ .................................................. G06K 9/00
[52] U.S. Cl. ........................................... 382/65; 382/58; 350/612; 350/622
[58] Field of Search ...................... 382/59, 65, 66, 67, 382/68; 350/612

[56] References Cited

U.S. PATENT DOCUMENTS

| | | | |
|---|---|---|---|
| 1,593,639 | 7/1926 | Reynolds | 382/66 |
| 3,463,882 | 5/1966 | Herbold | 382/66 |
| 3,619,028 | 11/1971 | Keene et al. | 358/285 |
| 3,758,783 | 9/1973 | Sick et al. | 382/65 |
| 3,950,712 | 4/1976 | Chenausky et al. | 350/612 |
| 4,012,585 | 3/1977 | Chen | 358/285 |
| 4,040,095 | 8/1977 | Abrams | 358/285 |
| 4,213,157 | 7/1980 | DeBenedictis et al. | 358/285 |
| 4,547,813 | 10/1985 | McGraw et al. | 358/285 |

Primary Examiner—David K. Moore
Assistant Examiner—Daniel Santos
Attorney, Agent, or Firm—Sughrue, Mion, Zinn, Macpeak & Seas

[57] ABSTRACT

An image reader is disclosed in which, upon application of an illuminating light beam to an original by an illuminating optical system, a light beam reflected from the original is applied through a contracting optical system to a line sensor for converting an optical image of the original into an image signal. The image reader has a first mirror provided for said original to reflect said light beam reflected from the original; a repetitive reflection optical system including a pair of parallel mirrors for causing said light beam reflected by the first mirror to go and return at least once in a reflection mode; and a second mirror provided for a contracting optical system to reflect the light beam thus caused to go and return towards the contracting optical system.

21 Claims, 4 Drawing Sheets

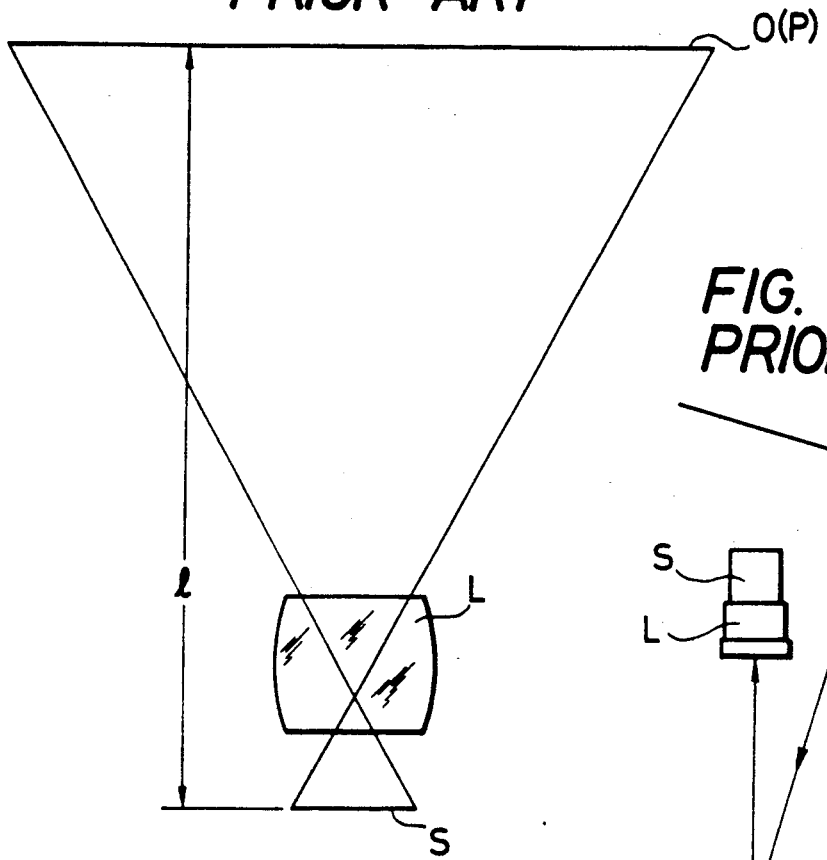
FIG. 1 PRIOR ART
FIG. 2 PRIOR ART
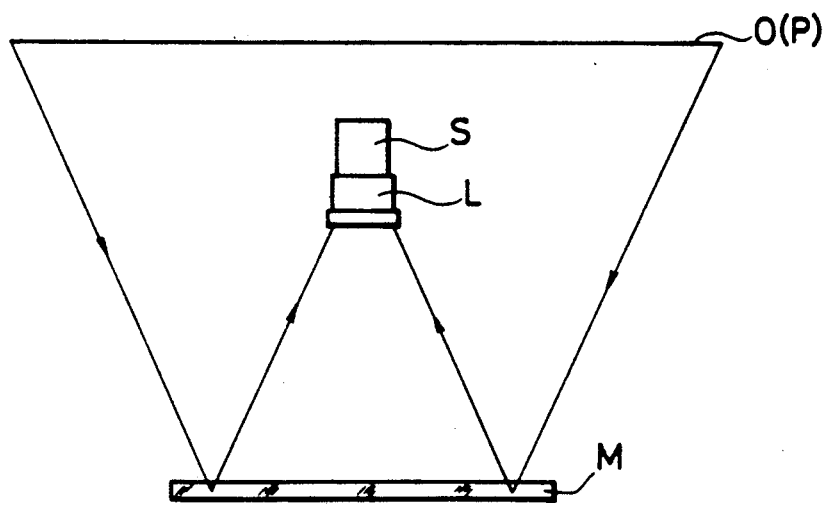
FIG. 3 PRIOR ART

IMAGE READER

This application is a continuation of application Ser. No. 07/091,136, filed Aug. 31, 1987 abandoned May 12, 1989.

BACKGROUND OF THE INVENTION

This invention relates to an image reader for converting original's image data into image signals in various image processing means such as facsimiles, image scanners and digital copiers.

PRIOR ART AND PROBLEMS

The fundamental arrangement of a conventional image reader of this type is such that the optical image of an original illuminated by an illuminating optical system is supplied through a reflecting optical system and a contracting optical system to a line sensor such as a CCD so that the image data are converted into image signals.

Its fundamental optical system is as shown in FIG. 1. A reflected light beam of an illuminating light beam applied to an original P on a surface O is applied through a contracting optical system L to a line sensor S. The optical path length l between the original's surface O and the line sensor S is determined according to the size of the original and the length of the line sensor S.

FIGS. 2 and 3 are explanatory diagrams showing a conventional image reader for realizing the fundamental optical system. In the conventional image reader, a single reflecting mirror M is disposed between the original's surface O and the assembly of the contracting optical system L and the line sensor S to provide a necessary optical path length so that the image reader can be miniaturized.

However, the conventional image reader is limited in miniaturization. This limitation obstructs miniaturization of the above-described image processing means. This tendency is significant especially when a large original is read, because in this case it is necessary to increase the rate of contraction of the contracting optical system L thereby to increase the optical path length l. Furthermore, in the conventional image reader, the original illuminating optical system is mounted on a supporting member, and the contracting optical system L, the line sensor S and the reflecting mirror M are mounted on another supporting member. This arrangement makes it difficult to apply the conventional image reader to an image processing device of the type that its image reader is moved. That is, in the case where the conventional image reader is applied to the image processing device, sometimes the positional relationships between the illuminating optical system, the original and the image reader are changed during the scanning of the original; that is, the original cannot correctly be scanned.

OBJECTS AND SUMMARY OF THE INVENTION

An object of this invention is to provide an image reader in which the above-described difficulties accompanying a conventional image reader are overcome, and which can be made smaller in size and can be provided as one unit.

Another object of the invention is to provide an image reader in which, even when it is miniaturized, adjustment for application of the reflected light beam to the line sensor in the correct direction can be achieved with ease.

This invention concerns an improvement of the conventional image reader in which one direction change mirror is disposed between the original's surface and the contracting optical system. In the image reader of the invention, a mirror provided for an original to reflect a light beam reflected from the original's surface, and a mirror provided for a contracting optical system to apply the reflected light beam to the contracting optical system are positioned separately, and a repetitive reflection optical system including mirrors for causing the light beam reflected from the mirror provided for the original to go and return at least once in a reflection mode is arranged between the two mirrors described above, the direction of the reflecting surface of one of the mirrors of the repetitive reflection optical system being adjustable. With this arrangement, a sufficiently long optical path can be provided in a small space, and therefore the image reader can be reduced in size. Furthermore, adjustment of only one mirror can apply the reflected light beam to the line sensor in the correct direction.

BRIEF DESCRIPTION OF THE DRAWINGS

In the accompanying drawings:

FIG. 1 is an optical path diagram showing the fundamental arrangement of an image reader;

FIGS. 2 and 3 are a side view and a front view outlining the arrangement of a conventional image reader, respectively;

DESCRIPTION OF THE PREFERRED EMBODIMENTS

This invention will be described with reference to its preferred embodiments.

Figure 4:
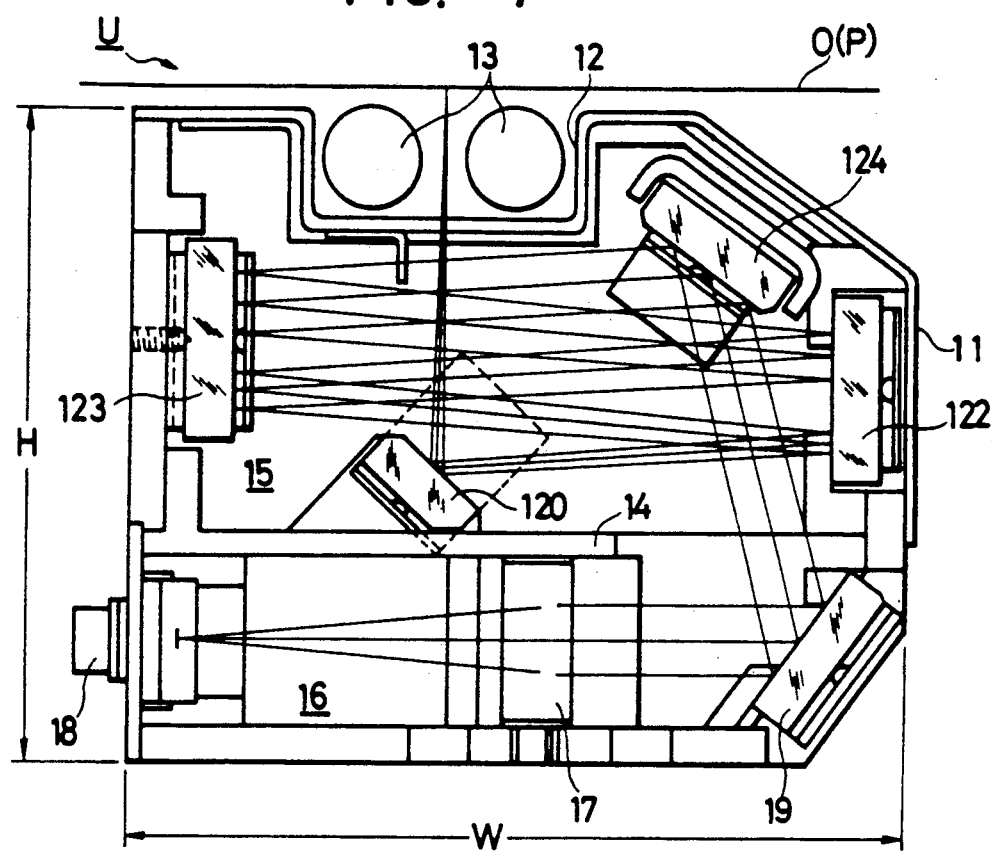
FIG. 4 is a sectional view showing one example of an image reader according to the invention.

FIG. 4 shows a first embodiment of the invention. That is, the first embodiment is provided as an original reading unit. All necessary elements are mounted on a unit supporting frame 11. An illuminating optical system for illuminating an original's surface O with fluorescent lamps 13 located in a recess 12 is mounted on top of the unit supporting frame 11.

The space in the unit supporting frame 11 is divided by a partition wall 14 into a repetitive reflection chamber 15 and a lens system accommodating chamber 16. A contracting lens 17 is disposed in the chamber 16 in such a manner that the optical axis of the lens 17 is substantially in parallel with the original's surface O. A line sensor 18 for receiving the optical image of an original P through the lens 17 is also arranged in the chamber 16. A mirror 19 for the contracting optical system is disposed in front of the converging or contracting lens 17 in such a manner that the mirror 19 forms about 45° with the optical axis of the lens 17. The partition wall 14 has an opening above the mirror 19 provided for the contracting optical system (hereinafter referred to as "a contracting optical system mirror 19".

On the other hand, in the repetitive reflection chamber 15, an original side mirror 120 is fixedly located below the pair of fluorescent lamps 13, so that the original side mirror 120 forms about 45° with respect to the original surface. Also, in the repetitive reflection chamber 15, there are fixedly provided a parallel repetitive reflex mirrors 122 and 123 and a transfer mirror 124 for applying the received light from the repetitive reflex mirrors 122 and 123 to the contracting optical system mirror 19. The repetitive reflex mirrors 122 and 123 are used to reflect twice the light beam received by the original side mirror 120 as shown in FIG. 4. The transfer mirror 124 is used to apply the reflected beam to the contracting optical system mirror.

The original reading device thus constructed operates as follows: When the original's surface O and the image reader are moved relative to each other, a light beam reflected from the original P is reflected by the original side mirror 120, the parallel repetitive reflex mirrors 122, 123, 122, 123, the transfer mirror 124, and the contracting optical system mirror 19 in the stated order, and is then applied through the contracting lens 17 to the line sensor 18, which outputs an image signal. The image signal is applied to an image processing means such as a facsimile, where it is suitably processed so as to be reproduced as an image. In the device of the invention, the optical path is made sufficiently long by the mirrors 122, 123. In other words, the horizontal and vertical dimensions W and H of the unit supporting frame 11 can be reduced with the optical path length set to a sufficiently large value.

A second embodiment will be described with reference to FIG. 5 in which the like components are designated by the same reference numerals. In this embodiment a trapezoidal mirror 20 is arranged in the repetitive reflection chamber 15 of the unit supporting frame 11 in such a manner that it is located between the fluorescent lamp 13 and the mirror 19. And a parallel mirror 21 is also disposed in the chamber 15 in such a manner as to confront with the trapezoidal mirror 20. The trapezoidal mirror 20 is obtained by forming as one unit a mirror 22 provided for an original in such a manner that it forms about 45° with respect to the original's surface O, a parallel mirror 23 which forms a repetitive reflection optical system together with the aforementioned parallel mirror 21, and a transfer mirror 24 for sending a light beam reflected from the repetitive reflection optical system to the contracting optical system mirror 19. A light beam reflected from the original P is caused to go and return twice between the trapezoidal mirror 20 and the parallel mirror 21 as in the first embodiment, and is then applied to the contracting optical system mirror 19 by the transfer mirror 24, as indicated by the optical paths in FIG. 1.

According to the invention, in the optical system thus organized, the direction of the parallel mirror 21, more specifically, the direction of its reflecting surface 21a is adjustable in two directions which are perpendicular to each other so that a light beam reflected from the original P is applied to the line sensor 18 with high accuracy. The trapezoidal mirror 20 is stationary.

Figure 5:
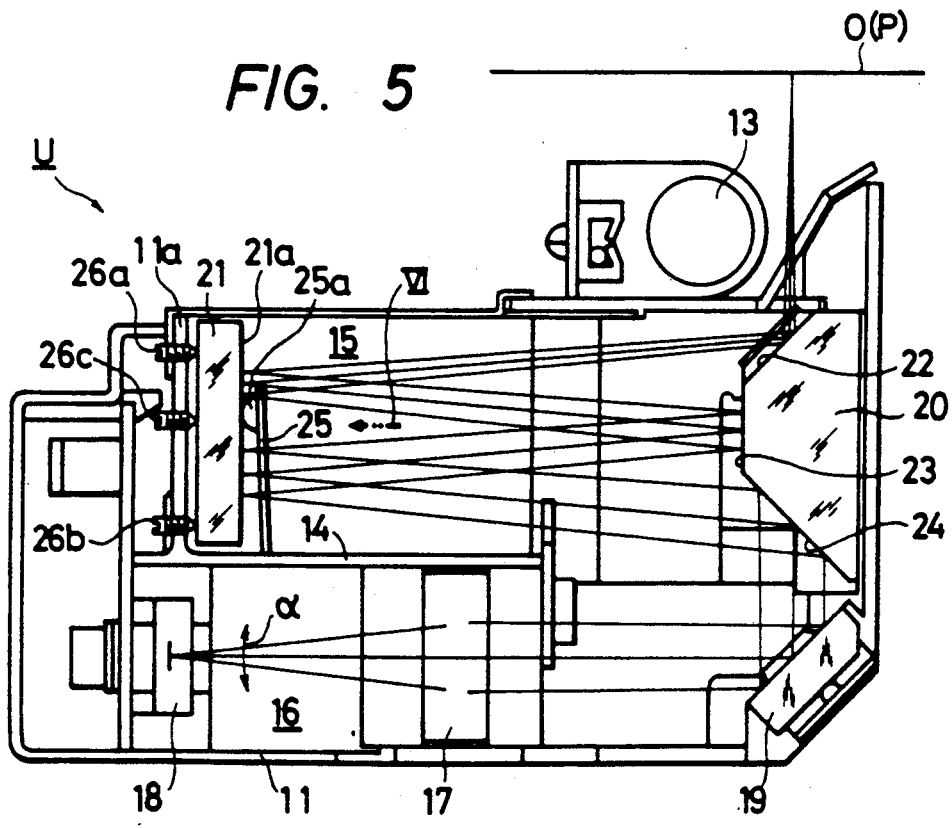
FIG. 5 is a sectional view showing another example of an image reader according to the invention.
Figure 6:
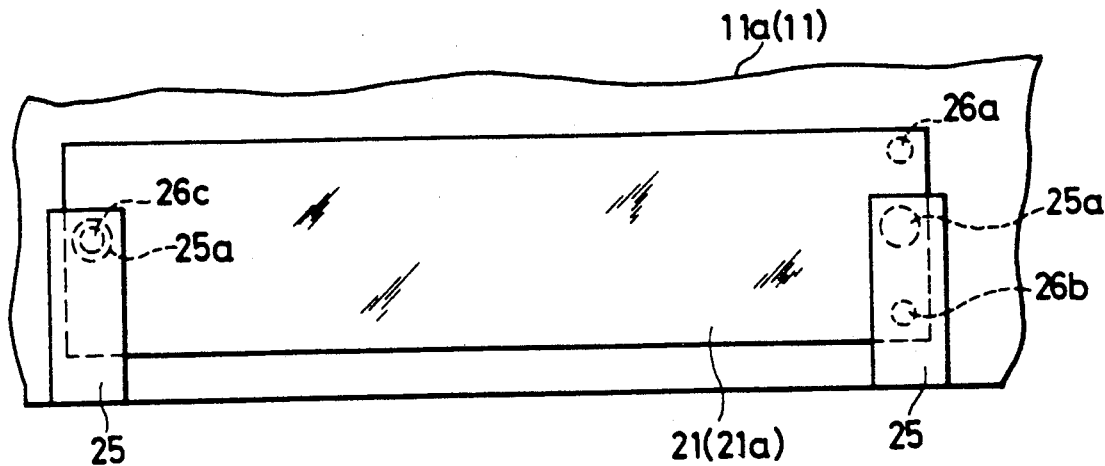
FIG. 6 is a diagram as viewed in the direction of the arrow VI in FIG. 5.

FIGS. 5 and 6 show one example of a parallel mirror adjusting mechanism. The semi-spherical parts 25a of leaf springs 25 push the parallel mirror 21 at both longitudinal ends towards a supporting board 11a. Three adjusting screws 26a, 26b and 26c are screwed into the supporting board 11a so as to abut against the rear surface of the parallel mirror 21. The adjusting screws 26a and 26b are positioned above and below of the semi-spherical part 25a of the leaf spring 25 at one of the two longitudinal ends of the parallel mirror 21, and the adjusting screw 26c is positioned on substantially the same axis as the semi-spherical part 25a of the leaf spring 25 at the other longitudinal end of the parallel mirror 21.

The functions of the adjusting mechanism thus constructed are as follows: Adjustment of the depths of the adjusting screws 26a and 26b engaged with the supporting board 11a changes the horizontal positions of the upper and lower portions (in FIG. 5) of the parallel mirror 21, so that the direction (inclination) of the reflecting surface 21a. As a result, the direction of the light beam reflected from the original P and applied to the line sensor 18 is changed as indicated by the arrow a. On the other hand, as the depth of the adjusting screw 26c (or 26a and 26b) engaged with the supporting board 11a is adjusted, the inclination of the reflecting mirror 21a in a direction perpendicular to the surface of the drawing is changed. Thus, the direction of the light beam incident to the line sensor 18 can be adjusted in a direction perpendicular to the surface of the drawing. The magnification of the original's image applied to the line sensor 18 can be adjusted by moving the three adjusting screws 26a, 26b and 26c back and forth for an equal distance.

The original reading device shown in FIG. 5 operates in the same way as in the first embodiment.

Figure 7:
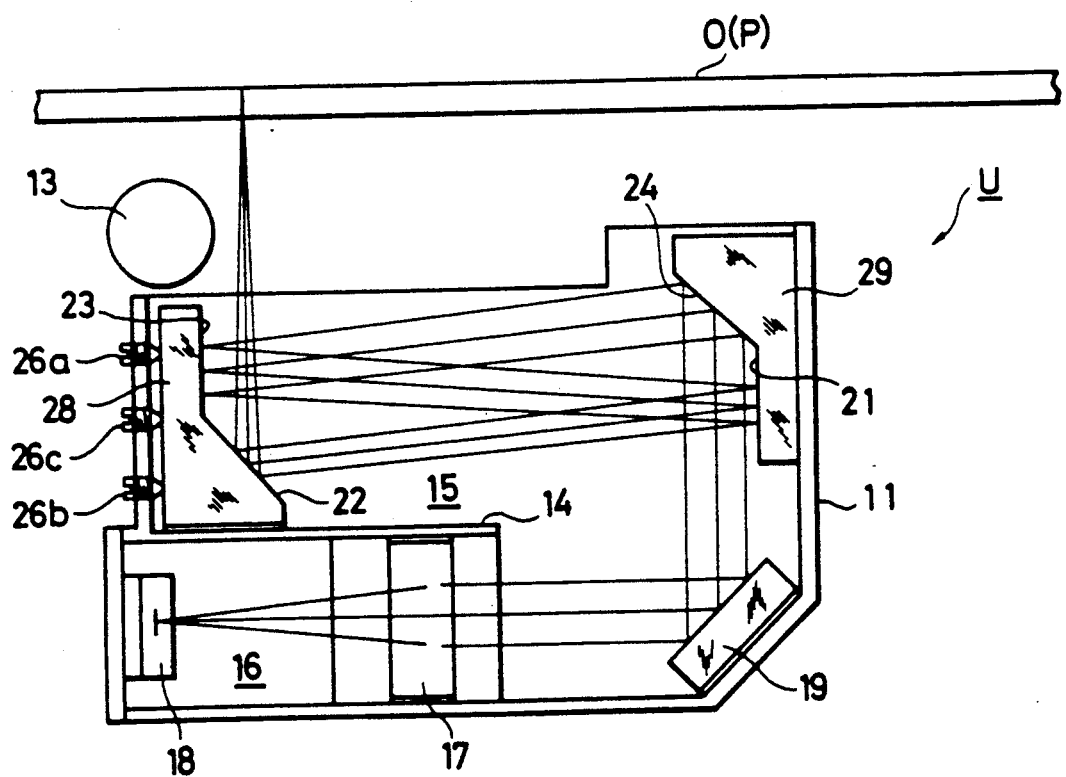
FIG. 7 is a sectional view showing still another example of an image reader according to the invention.

FIG. 7 shows a third embodiment of the invention. In the third embodiment, composite mirrors 29 and 28 are disposed on the right-handed side and the left-handed side of the repetitive reflection chamber 15, respectively. The composite mirror 28 is obtained by forming the original mirror 22 and the parallel mirror 23 of the preceding embodiments as one unit. Similarly, the composite mirror 29 is obtained by forming the parallel mirror 21 and the transfer mirror 24 of the first embodiment as one unit. In FIG. 3, the components which correspond functionally to those of the first and second embodiments are therefore designated by the same reference numerals or characters. In the third embodiment, the same mirror adjusting mechanism as that of the first and second embodiments is provided for one of the composite mirrors 28 and 29 (for the composite mirror 28 in FIG. 7). In the second embodiment, the number of times of reciprocation of the light beam between the composite mirrors 28 and 29 is 1.5 as shown in FIG. 7. Similarly as in the first embodiment, the resultant image reader is sufficiently long in optical path length, although it is small in size, and it can readily be adjusted. In the second embodiment, the trapezoidal mirror 20 is confronted with the parallel mirror 21 in the chamber 15; and in the third embodiment, the composite mirrors 28 and 29 are confronted with each other. Therefore, the embodiments are advantageous in that the number of components is small, chances for causing errors in mirror alignment scarcely occurs, and adjustment of only one of the two mirrors can apply the light beam reflected from the original to the line sensor 18 with high accuracy.

The image reading unit according to the invention is applicable to both an original driven type image reader and an original fixed type image reader.

FIG. 5 outline the arrangements of an original driven type image reader and an original ifxed type image reader which employ the original reading unit, the first embodiment of the invention.

Figure 8:
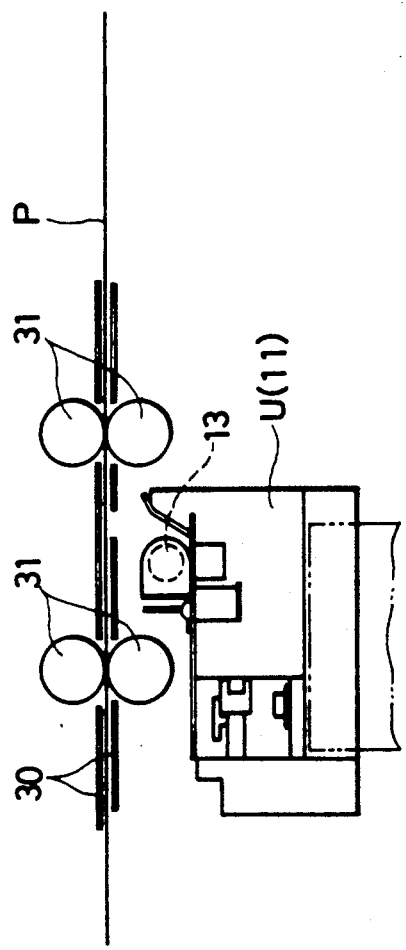
FIGS. 8 and 9 are front views outlining the arrangements of an original driven type image reader and and original fixed type image reader which employs the image reader of the invention.

In FIG. 8, the unit supporting frame 11 is fixedly provided, and an original conveying guide 20 is disposed above the fluorescent lamp 13. Pairs of original conveying rollers 31 are provided in the guide 20 in such a manner that the rollers 31 are turned while being in contact with the original P. This original driven type image reader is applicable to a facsimile or image scanner.

Figure 9:
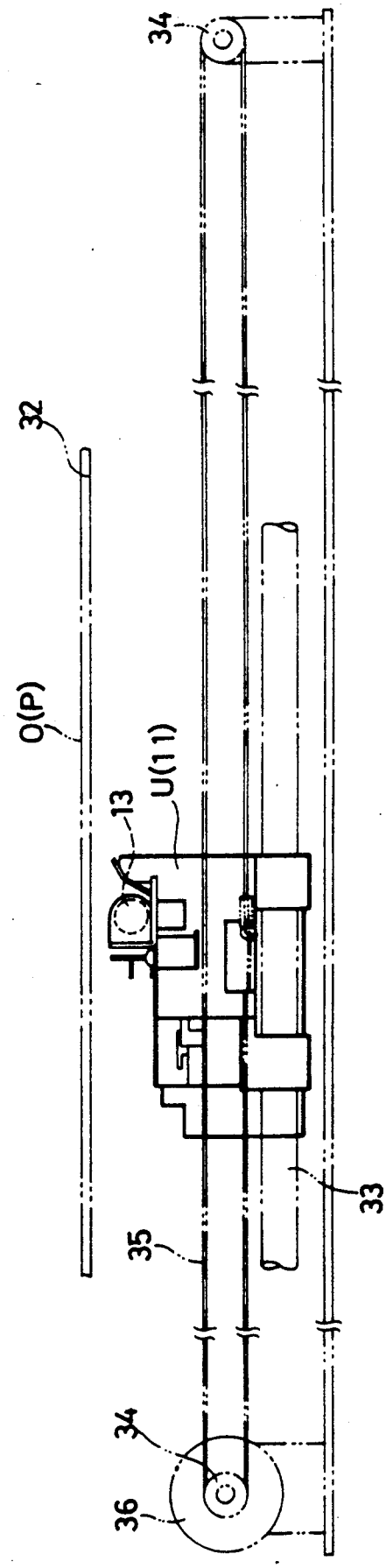

In the device of FIG. 9, the original P is fixed on an original placing board 32 made up of a transparent plate. A guide shaft 33 for guiding the unit supporting frame 11 in parallel with the board 32, and a drive wire or belt 35 laid over a pair of pulleys 34 are disposed below the board 32. The drive wire or belt 35 is fastened to the unit supporting frame 11, and the pulleys 34 is rotated by a drive motor 36. Therefore, as the drive motor 36 is driven, the unit supporting frame 11 is moved under the original placing board 32 so that the original P is scanned by the image reader. This original fixed type image reader is applied to a digital copier or image scanner as was described above. In the original fixed type image reader of the invention, the positional relationships between the fluorescent lamp 13, the original P and the reading unit U is maintained unchanged during scanning, because the fluorescent lamp 13 is mounted on the unit supporting frame 11.

As was described above, in the image reader of the invention, the optical path is made sufficiently long by means of the original mirror, the repetitive reflection optical system and the contracting optical system mirror. Therefore, the image reader of the invention can be made smaller in size than the conventional image reader. This will contribute to miniaturization of the image processing means. Furthermore, in the image reader of the invention, the direction of the reflecting surface of one of these mirrors is made adjustable so as to change the direction of the light beam incident to the line sensor. Therefore, even if the number of times of reflection is increased by the reflecting optical systems, the adjustment can be achieved with ease.

We claim:

1. An image reader in which, upon application of an illuminating light beam to an original by an illuminating optical system, a light beam reflected from said original is applied through a contracting optical system to a line sensor for converting an optical image of said original into an image signal, comprising:
   a first mirror provided for said original to reflect said light beam reflected from said original;
   a repetitive reflection optical system including mirrors for causing said light beam reflected by said first mirror to go and return at least once in a reflection mode; and
   a second mirror provided for a contracting optical system to reflect said light beam passed through said repetitive reflection optical system;
in which said first mirror provided for said original and said repetitive reflection optical system are arranged in a repetitive reflection chamber, and said contracting optical system, said second mirror and said line sensor are provided in a lens system accommodating chamber segregated from said repetitive chamber by a partition wall.

2. An image reader as claimed in claim 1, in which said first mirror provided for said original, said repetitive reflection optical system and said second mirror provided for said contracting optical system are supported by a unit supporting frame, and said illuminating optical system is mounted on said unit supporting frame.

3. An image reader as claimed in claim 1 further comprising means for adjusting the direction of the reflecting surface of one of said mirrors of said repetitive reflection optical system to change the direction of said reflected light beam incident to said line sensor.

4. An image reader as claimed in claim 3, in which said first mirror provided for said original, one of said mirrors of said repetitive reflection optical system, and a transfer mirror for sending said reflected light beam from said repetitive reflection system to said second mirror provided for said contracting optical system form three reflecting surfaces of a single trapezoidal mirror, and the direction of the reflecting surface of the other of mirrors of said repetitive reflection optical system is adjustable.

5. An image reader in which, upon application of an illuminating light beam to an original by an illuminating optical system, a light beam reflected from said original is applied through a contracting optical system to a line sensor for converting an optical image of said original into an image signal, comprising:
   a first mirror provided for said original to reflect said light beam reflected from said original;
   a repetitive reflection optical system including mirrors for causing said light beam reflected by said first mirror to go and return at least once in a reflection mode;
   a second mirror provided for a contracting optical system to reflect said light beam passed through said repetitive reflection optical system; and
   means for adjusting the direction of the reflecting surface of one of said mirrors of said repetitive reflection optical system to change the direction of said reflected light beam incident to said line sensor;
in which said first mirror provided for said original and one of said mirrors of said repetitive reflection optical system are mirror facets of a multifaceted mirror, while a transfer mirror for sending said reflected light beam from said repetitive reflection system to said second mirror provided for said contracting optical system and the other of the mirrors of said repetitive reflection optical system are mirror facets of a second multifaceted mirror, said first and second multifaceted mirrors being disposed in such a manner as to confront with each other, and the direction of the reflecting surface of one of said first and second multifaceted mirrors is adjustable.

6. An image reader as claimed in claim 4, in which said first mirror provided for said original, said repetitive reflection optical system and said second mirror provided for said contracting optical system are supported by a unit supporting frame, and said illuminating optical system is mounted on said unit supporting frame.

7. An image reader as claimed in claim 4, in which said first mirror provided for said original and said repetitive reflection optical system are arranged in a repetitive reflection chamber, and said contracting optical system and said line sensor are provided in a lens system accommodating chamber segregated from said repetitive reflection chamber by a partition wall.

8. An image reader in which, upon application of an illuminating light beam to an original by an illuminating optical system, a light beam reflected from said original is applied through a contracting optical system to a line sensor for converting an optical image of said original into an image signal, comprising:

- a first mirror provided for said original to reflect said light beam reflected from said original;
- a repetitive reflection optical system including mirrors for causing said light beam reflected by said first mirror to go and return at least once in a reflection mode; and
- a second mirror provided for a contracting optical system to reflect said light beam passed through said repetitive reflection optical system;

in which said first mirror provided for said original, one of said mirrors of said repetitive reflection optical system, and a transfer mirror for sending said reflected light beam from said repetitive reflection system to said second mirror provided for said contracting optical system form three reflecting surfaces of a single trapezoidal mirror.

9. An image reader in which, upon application of an illuminating light beam to an original by an illuminating optical system, a light beam reflected from said original is applied through a contracting optical system to a line sensor for converting an optical image of said original into an image signal, comprising:

- a first mirror provided for said original to reflect said light beam reflected from said original;
- a repetitive reflection optical system including mirrors for causing said light beam reflected by said first mirror to go and return at least once in a reflection mode; and
- a second mirror provided for a contracting optical system to reflect said light beam passed through said repetitive reflection optical system;

in which said said first mirror provided for said original and one of said mirrors of said repetitive reflection optical system are facets of a first multifaceted mirror, while a transfer mirror for sending said reflected light beam from said repetitive reflection system to said second mirror provided for said contracting optical system and the other of the mirrors of said repetitive reflection optical system are facets of second multifaceted mirror, said first and second multifaceted mirrors being disposed in such a manner as to confront with each other.

10. An image reader as claimed in claim 5, in which said first mirror provided for said original, said repetitive reflection optical system and said second mirror provided for said contracting optical system are supported by a unit supporting frame, and said illuminating optical system is mounted on said unit supporting frame.

11. An image reader as claimed in claim 5, in which said first mirror provided for said original and said repetitive reflection optical system are arranged in a repetitive reflection chamber, and said contracting optical system and said line sensor are provided in a lens system accommodating chamber segregated from said repetitive reflection chamber by a partition wall.

12. An image reader in which, upon application of an illuminating light beam to an original by an illuminating optical system, a light beam reflected from said original is applied through a contracting optical system to a line sensor for converting an optical image of said original into an image signal, comprising:

- a first mirror provided for said original to reflect said light beam reflected from said original;
- a repetitive reflection optical system including mirrors for causing said light beam reflected by said first mirror to go and return at least once in a reflection mode;
- a second mirror provided for a contracting optical system to reflect said light beam passed through said repetitive reflection optical system; and
- means for adjusting the direction of the reflecting surface of one of said mirrors of said repetitive reflection optical system to change the direction of said reflected light beam incident to said line sensor;

in which said said first mirror provided for said original, one of said mirrors of said repetitive reflection optical system, and a transfer mirror for sending said reflected light beam from said repetitive reflection system to said second mirror provided for said contracting optical system form three reflecting surfaces of a single trapezoidal mirror.

13. An image reader as claimed in claim 12, wherein the direction of the reflecting surface of another of said mirrors of said repetitive reflection optical system is adjustable.

14. An image reader in which, upon application of an illuminating light beam to an original by an illuminating optical system, a light beam reflected from said original is applied through a contracting optical system to a line sensor for converting an optical image of said original into an image signal, comprising:

- a first mirror provided for said original to reflect said light beam reflected from said original;
- a repetitive reflection optical system including mirrors for causing said light beam reflected by said first mirror to go and return at least once in a reflection mode;
- a second mirror provided for a contracting optical system to reflect said light beam passed through said repetitive reflection optical system; and
- means for adjusting the direction of the reflecting surface of one of said mirrors of said repetitive reflection optical system to change the direction of said reflected light beam incident to said line sensor;

in which said first mirror provided for said original and one of said mirrors of said repetitive reflection optical system are mirror facets of a first multifaceted mirror, while a transfer mirror for sending said reflected light beam from said repetitive reflection optical system to said second mirror provided for said contracting optical system and the other of the mirrors of said repetitive reflection optical system are mirror facets of a second multifaceted mirror, said first and second multifaceted mirrors being disposed in such a manner as to confront with each other.

15. An image reader as claimed in claim 14, wherein the direction of the reflecting surface of one of said first and second multifaceted mirrors is adjustable.

16. An image reader as claimed in claim 12, in which said first mirror provided for said original, said repetitive reflection optical system and said second mirror provided for said contracting optical system are supported by a unit supporting frame, and said illuminating optical system is mounted on said unit supporting frame.

17. An image reader as claimed in claim 14, in which said first mirror provided for said original, said repetitive reflection optical system and said second mirror provided for said contracting optical system are supported by a unit supporting frame, and said illuminating optical system is mounted on said unit supporting frame.

18. An image reader as claimed in claim 12, in which said first mirror provided for said original and said repetitive reflection optical system are arranged in a repetitive reflection chamber, and said contracting optical system and said line sensor are provided in a lens system accommodating chamber segregated from said repetitive reflection chamber by a partition wall.

19. An image reader as claimed in claim 14, in which said first mirror provided for said original and said repetitive reflection optical system are arranged in a repetitive reflection chamber, and said contracting optical system and said line sensor are provided in a lens system accommodating chamber segregated from said repetitive reflection chamber by a partition wall.

20. An image reader comprising an illuminating optical system for directing light toward an original to be read, a line sensor for converting an optical image of said original into an image signal, and a contracting optical system for applying light reflected from said original to said line sensor, the improvement comprising a repetitive reflection optical system disposed in the optical path between said original and said contracting optical system, said repetitive reflection optical system comprising:

a first mirro (120) for receiving light reflected from said original and for reflecting said received light;

first (122) and second (123) repetitive reflection mirrors for receiving light from said first mirror and for subjecting said light to repetitive reflection wherein at least one of said first and second repetitive reflection mirrors reflects said light plural times during passage of said light from said first mirror to said contracting optical system, said first and second repetitive reflection mirrors being fixed relative to said first mirror during reading of said original; and a transfer mirror (124) for receiving light after plural reflections of said light by said one of said first and second mirrors and for reflecting said light toward said contracting optical system.

21. An image reader according to claim 20, wherein said contracting optical system includes a contracting optical system mirror (19) for receiving and reflecting light reflected by said transfer mirror, and a contracting lens for focusing light reflected from said contracting optical system mirror onto said line sensor, said contracting lens having an optical axis substantially parallel to a surface of said original.

* * * * *